United States Patent
Banjar et al.

(10) Patent No.: US 11,713,766 B2
(45) Date of Patent: Aug. 1, 2023

(54) SUBMERSIBLE MOTOR AND METHOD FOR MITIGATING WATER INVASION TO A SUBMERSIBLE MOTOR

(71) Applicant: SAUDI ARABIAN OIL COMPANY, Dhahran (SA)

(72) Inventors: Hattan M. Banjar, Dhahran (SA); Jinjiang Xiao, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 56 days.

(21) Appl. No.: 17/455,622

(22) Filed: Nov. 18, 2021

(65) Prior Publication Data

US 2023/0151819 A1    May 18, 2023

(51) Int. Cl.

| | |
|---|---|
| *F04D 27/00* | (2006.01) |
| *F04D 13/08* | (2006.01) |
| *F04D 15/00* | (2006.01) |
| *F04D 15/02* | (2006.01) |
| *F04D 13/10* | (2006.01) |
| *G01F 23/22* | (2006.01) |
| *G01M 3/16* | (2006.01) |

(52) U.S. Cl.
CPC ........... *F04D 27/00* (2013.01); *F04D 13/086* (2013.01); *F04D 15/00* (2013.01); *G01F 23/22* (2013.01); *G01M 3/16* (2013.01); *F04D 13/10* (2013.01); *F04D 15/0088* (2013.01); *F04D 15/0209* (2013.01); *F04D 15/0218* (2013.01)

(58) Field of Classification Search
CPC ........ F04D 27/00; F04D 13/086; F04D 15/00; F04D 13/10; F04D 15/0088; F04D 15/0209; F04D 15/0218; G01F 23/22; G01M 3/16; F04B 51/00; F04B 23/021; F04B 49/02; H02K 5/132
USPC ............................................. 417/36; 310/87
See application file for complete search history.

(56) References Cited

U.S. PATENT DOCUMENTS

| | | | |
|---|---|---|---|
| 1,989,104 A | | 1/1935 | Mendenhall et al. |
| 4,053,398 A | | 10/1977 | Venema |
| 4,104,551 A | | 8/1978 | Blank et al. |
| 4,746,423 A | * | 5/1988 | Moyer .................... B09C 1/002 210/136 |

(Continued)

FOREIGN PATENT DOCUMENTS

| | | |
|---|---|---|
| JP | 2005-282457 A | 10/2005 |
| KR | 2001-0107247 A | 12/2001 |

(Continued)

*Primary Examiner* — Kenneth J Hansen
*Assistant Examiner* — Benjamin Doyle
(74) *Attorney, Agent, or Firm* — Osha Bergman Watanabe & Burton LLP

(57) ABSTRACT

A method for mitigating water invasion to a submersible motor includes: forming an accumulation zone within an inner space of the submersible motor, wherein the accumulation zone is disposed at a bottom of the inner space below a motor shaft; measuring a conductivity of a fluid inside the accumulation zone using a sensor, wherein the fluid comprises water and dielectric oil; comparing the conductivity of the fluid with a threshold value; upon detecting that the conductivity of the fluid is greater than the threshold value, activating a solenoid pump to discharge the fluid from the accumulation zone to an outside of the submersible motor.

12 Claims, 2 Drawing Sheets

(56) References Cited

U.S. PATENT DOCUMENTS

| | | | | |
|---|---|---|---|---|
| 4,824,562 A * | 4/1989 | Carson | B01D 17/0214 |
| | | | 210/170.07 |
| 5,261,791 A * | 11/1993 | Goguen | B09C 1/007 |
| | | | 210/776 |
| 6,167,965 B1 * | 1/2001 | Bearden | F04D 15/0088 |
| | | | 417/18 |
| 6,364,620 B1 * | 4/2002 | Fletcher | F04D 15/0218 |
| | | | 340/854.8 |
| 6,435,837 B1 * | 8/2002 | Lopez | F04D 13/16 |
| | | | 417/40 |
| 7,492,272 B1 * | 2/2009 | MacDonald | G01F 23/2925 |
| | | | 73/290 V |
| 8,347,953 B1 * | 1/2013 | Elizondo, Jr. | E21B 47/008 |
| | | | 166/250.01 |
| 8,512,513 B2 * | 8/2013 | Leinonen | F04D 15/0218 |
| | | | 162/61 |
| 8,760,302 B1 * | 6/2014 | MacDonald | F04B 23/021 |
| | | | 340/602 |
| 9,441,633 B2 * | 9/2016 | Sheth | F04D 15/0263 |
| 9,689,529 B2 * | 6/2017 | Meyer | E21B 47/008 |
| 11,187,223 B2 * | 11/2021 | Ward | F04D 13/12 |
| 2003/0198562 A1 * | 10/2003 | Blauch | E21B 37/00 |
| | | | 417/423.3 |
| 2004/0231842 A1 * | 11/2004 | Shammai | E21B 49/10 |
| | | | 166/264 |
| 2007/0114040 A1 | 5/2007 | Jamieson et al. |
| 2008/0173088 A1 * | 7/2008 | Quill | F04B 51/00 |
| | | | 417/1 |
| 2010/0189570 A1 * | 7/2010 | Hsu | F04D 15/0218 |
| | | | 417/44.1 |
| 2013/0272898 A1 * | 10/2013 | Toh | F04D 13/10 |
| | | | 417/44.1 |
| 2015/0104328 A1 * | 4/2015 | Babbitt | F04B 23/04 |
| | | | 417/279 |
| 2018/0328365 A1 * | 11/2018 | Eslinger | F04D 13/10 |
| 2018/0340416 A1 * | 11/2018 | Nemoto | E21B 41/0007 |
| 2018/0347346 A1 * | 12/2018 | Gouda | F04D 29/061 |
| 2021/0018001 A1 * | 1/2021 | Stewart | F16N 29/00 |
| 2022/0065081 A1 * | 3/2022 | Wrighton | F04D 13/0626 |
| 2022/0082009 A1 * | 3/2022 | Hondred | E21B 47/11 |

FOREIGN PATENT DOCUMENTS

| | | |
|---|---|---|
| WO | 97/08459 A1 | 3/1997 |
| WO | 2016/153485 A1 | 9/2016 |

\* cited by examiner

SUBMERSIBLE MOTOR AND METHOD FOR MITIGATING WATER INVASION TO A SUBMERSIBLE MOTOR

BACKGROUND

In some artificial lift methods, such as Electric Submersible Pumps (ESPs) and Electric Submersible Progressive Cavity Pumps (ESPCPs), a downhole motor is required in order to transfer electrical energy into mechanical energy, which is then transferred to the associated pump via a shaft. The motor is serviced with dielectric oil, which is non-conductive. When the motor operates, the dielectric oil circulates inside the motor to provide lubrication and electrical insulation between parts of the motor.

As the motor runs, water or other substance of the formation fluid may undesirably enter the motor either directly or through the protector. Because water is electrically conductive, its accumulation and circulation inside the motor may undermine the electrical insulation between motor parts and eventually damage the motor. The parts of the motor may also become vulnerable to overheating when not properly lubricated by dielectric oil.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for mitigating water invasion to a submersible motor. The method includes: forming an accumulation zone within an inner space of the submersible motor, wherein the accumulation zone is disposed at a bottom of the inner space below a motor shaft; measuring a conductivity of a fluid inside the accumulation zone using a sensor, wherein the fluid comprises water and dielectric oil; comparing the conductivity of the fluid with a threshold value; upon detecting that the conductivity of the fluid is greater than the threshold value, activating a solenoid pump to discharge the fluid from the accumulation zone to an outside of the submersible motor In another aspect, embodiments disclosed herein relate to a submersible motor. The submersible motor includes: an inner space; a motor shaft; an accumulation zone formed within the inner space and disposed at a bottom of the inner space below the motor shaft; a sensor that measures a conductivity of a fluid inside the accumulation zone, wherein the fluid comprises water and dielectric oil; a circuit, coupled to the sensor, that compares the conductivity of the fluid with a threshold value; and a solenoid pump, wherein, upon detecting that the conductivity of the fluid is greater than the threshold value, the circuit activates the solenoid pump to discharge the fluid from the accumulation zone to an outside of the submersible motor.

Other aspects and advantages of the claimed subject matter will be apparent from the following description and the appended claims.

Unless otherwise specified in this disclosure, terms such as "high," "low," "above," "below," "top," and "bottom," when used to describe a physical position, all use the distance from the center of the earth as a reference. For example, a higher position has a greater distance from the center of the earth than a lower position; part A being above part B means part A has a greater distance from the center of the earth than part B; and the bottom of part C refers to a position of part C that is closer to the center of the earth than the other positions of part C.

DETAILED DESCRIPTION

Figure 1A:
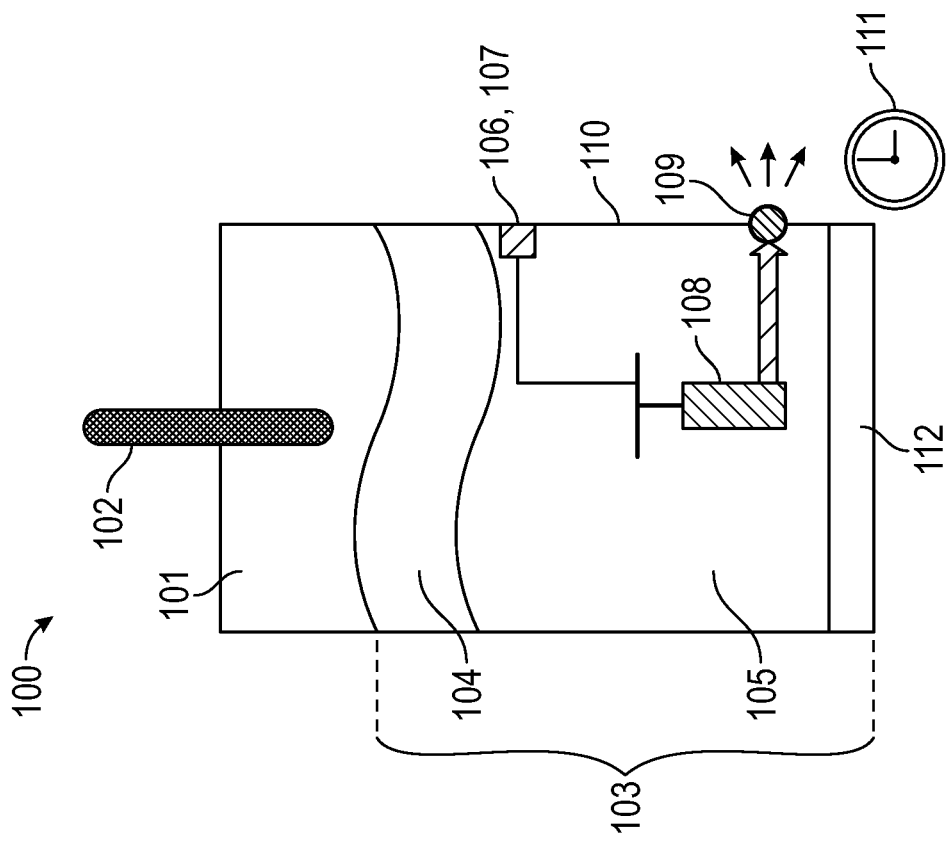
FIGS. 1A and 1B show a submersible motor according to one or more embodiments.

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A, 1B, and 2, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Figure 1B:
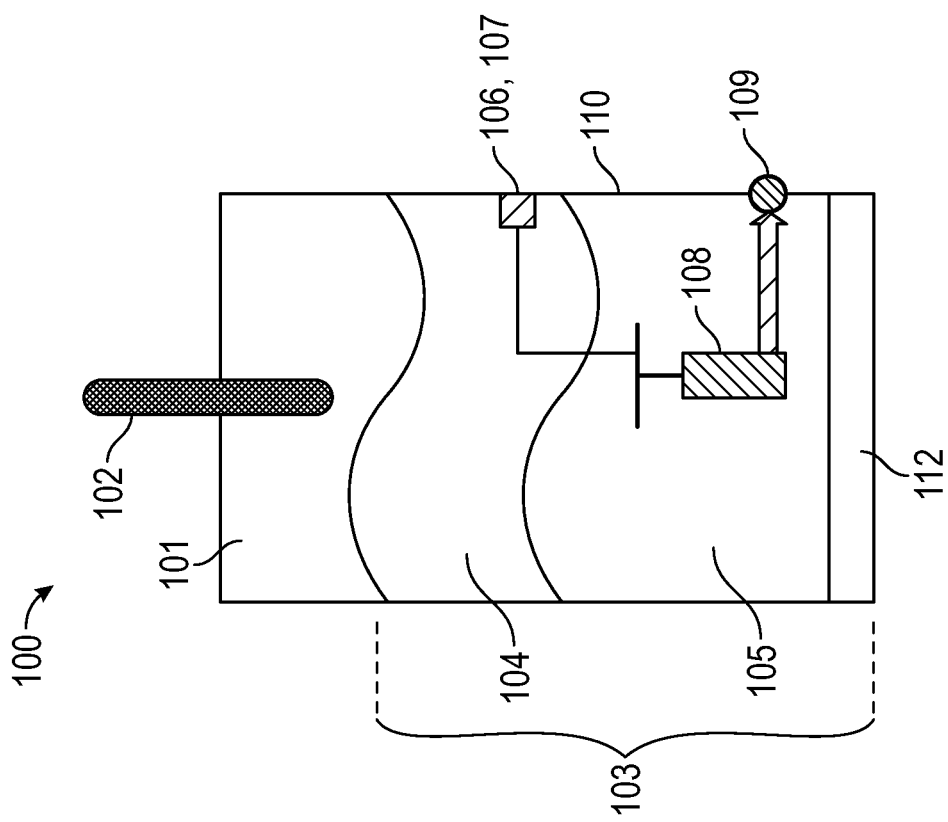

FIGS. 1A and 1B show a submersible motor 100 according to one or more embodiments. The two figures differ in that the submersible motor 100 in FIG. 1B is actively running to mitigate water invasion while the submersible motor 100 in FIG. 1A is not.

In FIGS. 1A and 1B, the submersible motor 100 includes an inner space 101 defined by a wall 110. A motor shaft 102 is disposed on a side of the wall 110. Although FIGS. 1A and 1B illustrate the motor shaft 102 being disposed on the upper side of the wall 110 with a vertical orientation, it is entirely possible that the motor shaft 102 may be disposed on other sides of the wall 110 and may have a different orientation.

The submersible motor 100 further includes an accumulation zone 103 formed within the inner space 101 and disposed at a bottom of the inner space 101 below the motor shaft 102. The accumulation zone 103 is designed for water, which enters the inner space 101 from outside the submersible motor 100, to accumulate. Because the submersible motor 100 is normally filled with dielectric oil and because the density of water is greater than that of dielectric oil, the invading water tends to accumulate from the bottom of the submersible motor 100 and below the dielectric oil due to gravity.

With the accumulation of water, the accumulation zone 103 is gradually filled with fluid that has two layers: the upper layer with dielectric oil 104; and the lower layer with water 105. Other soluble or insoluble substances, of course, may exist in the fluid as well. When the submersible motor 100 is in operation, because the accumulation of water 105 and the circulation of the dielectric oil 104 are dynamic processes, the interface separating the two layers may be moving and not readily distinguishable. Likewise, the overall fluid level in the accumulation zone 103 may move from time to time. FIGS. 1A and 1B thus utilize the wave-shaped lines to illustrate the moving levels of the water 105 and the dielectric oil 104. These wave-shaped lines are not to be interpreted as delineating the actual boundaries of the two layers of fluid.

In some embodiments, a mechanism may be implemented in the accumulation zone 103 to enhance the effect of oil-water separation. Such a mechanism may be centrifugal (driven by the same motor shaft, or hydrocyclone), membrane, or electrostatic, etc., which are widely used in the industry.

The submersible motor 100 further includes a sensor 106, which is coupled to a circuit 107. The sensor 106 may be disposed on or secured to the wall 110 within the accumulation zone 103. The sensor 106 measures the conductivity of the fluid inside the accumulation zone 103: When the sensor 106 is immersed in pure dielectric oil, the sensor 106 reads the conductivity value of dielectric oil; When the sensor 106 is immersed in pure water, the sensor 106 reads the conductivity value of water. In reality, because the fluid in the accumulation zone 103 is often a mixture of dielectric oil 104 and water 105 and because the interface between the two fluids is not always distinguishable, the sensor 106 may read a value between the two conductivity values.

The conductivity values of water and of dielectric oil may be obtained, either through sampling or through calculation as functions of downhole distance and temperature. The calculation, which is known in the art, is not described in detail here for the sake of brevity.

The circuit 107 controls the sensor 106 to measure the conductivity of the fluid in which the sensor 106 is immersed. The circuit 107 then compares the measurement result with a threshold value stored in the circuit. The threshold value is pre-configured to be greater than the conductivity of the dielectric oil 104 but less than or equal to the conductivity of the water 105.

The submersible motor 100 further includes a solenoid pump 108, such as a cylindrical solenoid pump, which may be fully or partially disposed within the accumulation zone 103. When electric current is applied to the solenoid pump 108, the electromagnetic core moves against a spring to slide a diaphragm into the discharge position so the solenoid pump 108 operates. When electric current is removed, the diaphragm slides back into the suction position so the solenoid pump 108 stops operating. The solenoid pump 108 is electrically connected to the circuit 107. In some embodiments, the submersible motor 100 may include a space, such as housing 112, for housing of the power source and peripheral circuitry of the solenoid pump 108 and the sensor 106. The housing 112 may be attached to the motor housing (not shown) by a flange and some wiring.

When the submersible motor 100 begins to operate, water has not noticeably entered the inner space 101 and the accumulation zone 103 is mostly filled with the dielectric oil 104. The reading of the sensor 106 is thus about the same as the conductivity value of dielectric oil. In this situation, which is illustrated in FIG. 1A, no water removal takes place.

As the water 105 accumulates, the water level rises and the reading of the sensor 106 increases accordingly. When the reading of the sensor 106 reaches the threshold value, it indicates that water has occupied substantial space in the accumulation zone 103 and effort is needed to remove water from the accumulation zone 103. This is illustrated in FIG. 1B.

Continuing with FIG. 1B, the circuit 107 transmits an electrical signal to the solenoid pump 108 to activate the solenoid pump 108 to remove the water 105. The solenoid pump 108 then starts to discharge the fluid, now significantly composed of water 105, from the accumulation zone 103 to the outside of the submersible motor 100.

The discharge is via a one-way-only check valve 109 disposed on the wall 110. A one-way-only check valve, which is widely used in the industry, allows fluid to flow in one direction but not the other. In some embodiments of this invention, the check valve 109 is connected to the outlet of the solenoid pump 108 and allows fluid to exit the submersible motor 100 while disallowing external fluid to enter the submersible motor 100 from the outside.

In some embodiments, the space vacated by the discharge is refilled with fluid from the protector (not shown in the drawings) of the submersible motor 100. The protector may be filled from the flowing formation fluid or from an oil container connected to the assembly and in communication with the protector by a capillary line. Various mechanisms exist in the industry to refill the submersible motor 100. The detail is thus omitted for the sake of brevity.

In some embodiments, the process of discharge may be further automated. To this end, the solenoid pump 108 may be configured to automatically stop after being activated for a duration 111 (represented by the icon of a clock in FIG. 1B). The duration 111, which may be pre-calculated and stored in a memory of the solenoid pump 108, represents the time it takes for the solenoid pump 108 to discharge the fluid so as to bring down the amount of water to a desired level.

In some embodiments, the calculation may first estimate, through experiments or simulation, the rate of water influx to the accumulation zone 103. The calculation may then subtract the water influx rate from the flow rate of the solenoid pump 108 to obtain a net discharge rate. The duration 111 may thus be calculated by dividing the desired amount of discharged fluid, which may be determined based on the dimension of the accumulation zone 103 and/or the sensor 106's position, by the net discharge rate.

Figure 2:
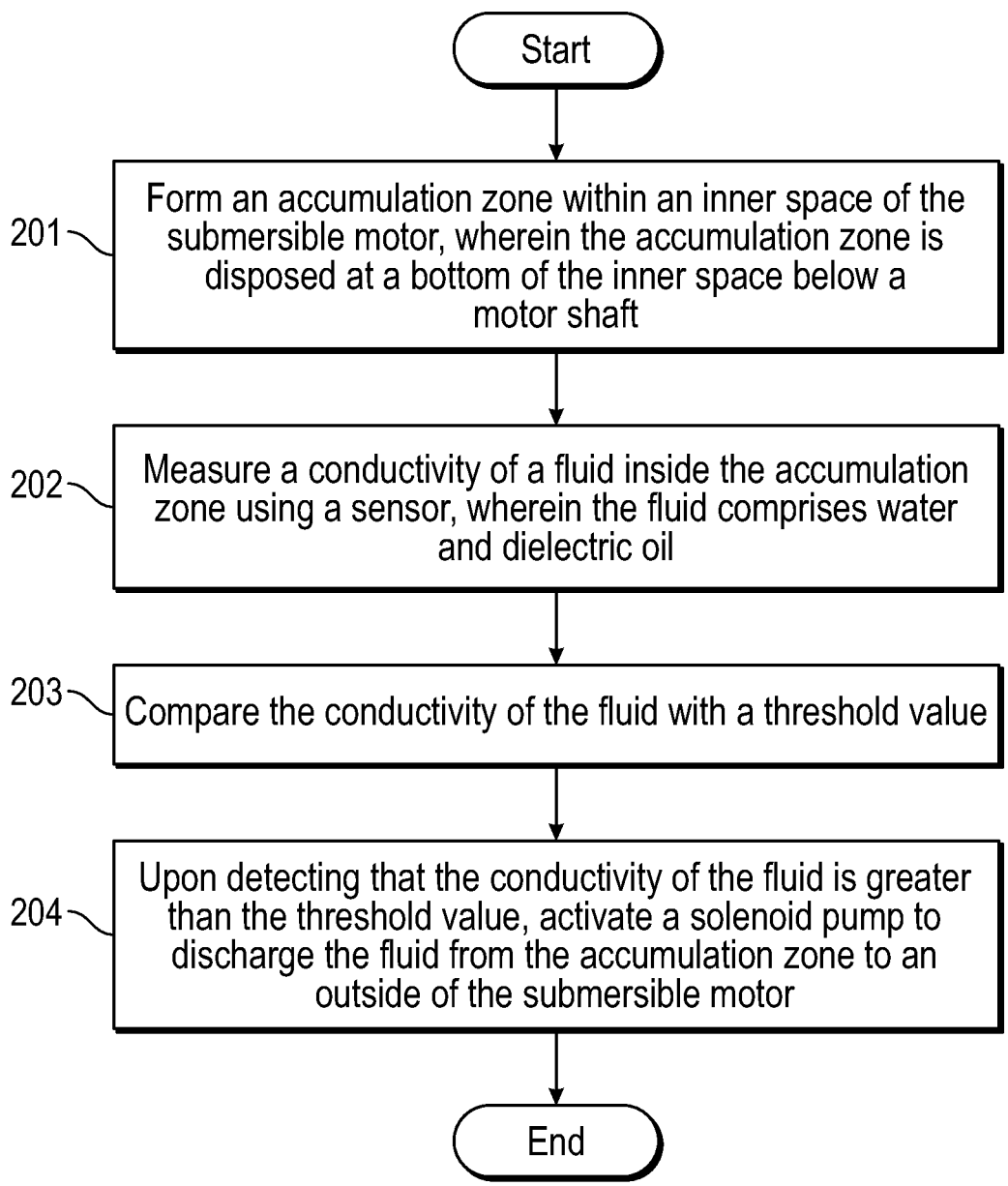
FIG. 2 shows a flowchart of a method for mitigating water invasion to a submersible motor according to one or more embodiments.

FIG. 2 shows a flowchart of a method for mitigating water invasion to a submersible motor according to one or more embodiments.

At step 201, an accumulation zone is formed within an inner space of the submersible motor, wherein the accumulation zone is disposed at a bottom of the inner space below a motor shaft.

At step 202, a conductivity of a fluid inside the accumulation zone is measured using a sensor, wherein the fluid comprises water and dielectric oil.

At step 203, the conductivity of the fluid is compared with a threshold value.

At step 204, upon detecting that the conductivity of the fluid is greater than the threshold value, a solenoid pump is activated to discharge the fluid from the accumulation zone to an outside of the submersible motor.

Embodiments of the present disclosure may advantageously improve the life of the submersible motor by the reducing risk of parts being burnt down due to overheating or failure of insulation. With the features of automatically starting and stopping the solenoid pump, embodiments of the present disclosure may advantageously reduce human effort in the maintenance of the submersible motor.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for mitigating water invasion to a submersible motor, comprising:
   forming an accumulation zone within an inner space of the submersible motor, wherein the accumulation zone is disposed at a bottom of the inner space below a motor shaft;
   measuring a conductivity of a fluid inside the accumulation zone using a sensor, wherein the fluid comprises water and dielectric oil;
   comparing the conductivity of the fluid with a threshold value;
   upon detecting that the conductivity of the fluid is greater than the threshold value, activating a solenoid pump to discharge the fluid from the accumulation zone to an outside of the submersible motor.

2. The method of claim 1, wherein the solenoid pump discharges the fluid from the accumulation zone via a one-way-only check valve disposed on a wall of the inner space.

3. The method of claim 1, wherein the solenoid pump is placed within the accumulation zone.

4. The method of claim 1,
   wherein the sensor is electrically connected to the solenoid pump, and
   wherein, upon detecting that the conductivity of the fluid is greater than the threshold value, the sensor transmits an electrical signal to activate the solenoid pump.

5. The method of claim 4,
   wherein, after being activated for a pre-configured duration, the solenoid pump automatically stops.

6. The method of claim 5,
   wherein the pre-configured duration is based on a flowrate of the solenoid pump and the threshold value, and
   wherein the duration is stored in a memory of the solenoid pump.

7. A submersible motor, comprising:
   an inner space;
   a motor shaft;
   an accumulation zone formed within the inner space and disposed at a bottom of the inner space below the motor shaft;
   a sensor that measures a conductivity of a fluid inside the accumulation zone, wherein the fluid comprises water and dielectric oil;
   a circuit, coupled to the sensor, that compares the conductivity of the fluid with a threshold value; and
   a solenoid pump,
   wherein, upon detecting that the conductivity of the fluid is greater than the threshold value, the circuit activates the solenoid pump to discharge the fluid from the accumulation zone to an outside of the submersible motor.

8. The submersible motor of claim 7, further comprising a one-way-only check valve disposed on a wall of the inner space,
   wherein the solenoid pump discharges the fluid from the accumulation zone via the check valve.

9. The submersible motor of claim 7, wherein the solenoid pump is placed within the accumulation zone.

10. The submersible motor of claim 7,
    wherein the circuit is electrically connected to the solenoid pump, and
    wherein, upon detecting that the conductivity of the fluid is greater than the threshold value, the circuit transmits an electrical signal to the solenoid pump to activate the solenoid pump.

11. The submersible motor of claim 10,
    wherein, after being activated for a pre-configured duration, the solenoid pump automatically stops.

12. The submersible motor of claim 11,
    wherein the pre-configured duration is based on a flowrate of the solenoid pump and the threshold value, and wherein the duration is stored in a memory of the solenoid pump.

\* \* \* \* \*